United States Patent
He et al.

(10) Patent No.: US 11,838,553 B2
(45) Date of Patent: Dec. 5, 2023

(54) GREEN METADATA SIGNALING

(71) Applicant: QUALCOMM Incorporated, San Diego, CA (US)

(72) Inventors: Yong He, San Diego, CA (US); Muhammed Zeyd Coban, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/816,237

(22) Filed: Jul. 29, 2022

(65) Prior Publication Data

US 2023/0056436 A1    Feb. 23, 2023

Related U.S. Application Data

(60) Provisional application No. 63/231,015, filed on Aug. 9, 2021.

(51) Int. Cl.
| | | |
|---|---|---|
| *H04N 19/70* | (2014.01) | |
| *H04N 19/159* | (2014.01) | |
| *H04N 19/176* | (2014.01) | |
| *H04N 19/169* | (2014.01) | |

(52) U.S. Cl.
CPC .......... *H04N 19/70* (2014.11); *H04N 19/159* (2014.11); *H04N 19/176* (2014.11); *H04N 19/1883* (2014.11)

(58) Field of Classification Search
CPC .... H04N 19/70; H04N 19/159; H04N 19/176; H04N 19/1883; H04N 19/14; H04N 19/127
See application file for complete search history.

(56) References Cited

U.S. PATENT DOCUMENTS

2016/0105680 A1* 4/2016 Fernandes ............ H04N 19/172
375/240.24

OTHER PUBLICATIONS

Ducloux (Harmonic) X., et al., "AHG on Green MPEG", 117. MPEG Meeting, Jan. 16, 2017-Jan. 20, 2017, Geneva, (Motion Picture Expert Group or ISO/IEC JTC1/SC29/WG11), No. m39616, Jan. 15, 2017, 3 Pages, XP030067961, p. 1, paragraph 2.1-p. 2, paragraph 2.3.

(Continued)

*Primary Examiner* — Nam D Pham
(74) *Attorney, Agent, or Firm* — Polsinelli LLP

(57) ABSTRACT

Disclosed are systems, methods, apparatuses, and computer-readable media for processing video data. For instance, an apparatus for processing video data, may include: at least one memory; and at least one processor coupled to the at least one memory, the at least one processor being configured to: obtain a bitstream; retrieve a granularity type syntax element associated with the bitstream, the granularity type syntax element specifying a type of granularity of one or more pictures over which complexity metrics (CM) associated with the bitstream are applicable; retrieve a period type syntax element associated with the bitstream, the period type syntax element indicating an upcoming period of time or a set of pictures over which the CM are applicable; and decode a portion of the bitstream based on the granularity type syntax element and the period type syntax element.

35 Claims, 6 Drawing Sheets

(56) References Cited

OTHER PUBLICATIONS

Herglotz (Fau) C., et al., "AHG9: Green Metadata SEI message for VVC", 135. MPEG Meeting, Jul. 12, 2021-Jul. 16, 2021, Online, (Motion Picture Expert Group or ISO/IEC JTC1/SC29/WG11), No. m57185, JVET-W0071, Jun. 30, 2021, XP030296755, Scope, p. 1, paragraph 1, p. 13, paragraph 5.2.4.1-p. 14, 24, 25.
International Search Report and Written Opinion—PCT/US2022/074402—ISA/EPO—dated Oct. 24, 2022.

* cited by examiner

GREEN METADATA SIGNALING

CROSS-REFERENCE TO RELATED APPLICATIONS

This application claims the benefit of U.S. Provisional Application No. 63/231,015, filed Aug. 9, 2021, which is hereby incorporated by reference, in its entirety and for all purposes.

TECHNICAL FIELD

This application is generally related to video processing. For example, aspects of the application relate to improving video coding techniques (e.g., encoding and/or decoding video) with respect to green metadata.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), among others, as well as proprietary video coder-decoder (codecs)/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding techniques with better coding efficiency are needed.

BRIEF SUMMARY

Systems and techniques are described herein for processing video data. According to at least one example, a method of processing video is provided, including: obtaining a bitstream; and retrieving a granularity type syntax element associated with the bitstream, the granularity type syntax element specifying a type of granularity over which complexity metrics (CM) associated with the bitstream are applicable.

Disclosed are systems, methods, apparatuses, and computer-readable media for processing video data. In one illustrative example an apparatus for processing video data is provided. The apparatus includes: at least one memory; and at least one processor (e.g., implemented in circuitry) coupled to the at least one memory, the at least one processor being configured to: obtain a bitstream; retrieve a granularity type syntax element associated with the bitstream, the granularity type syntax element specifying a type of granularity of one or more pictures over which complexity metrics (CM) associated with the bitstream are applicable; retrieve a period type syntax element associated with the bitstream, the period type syntax element indicating an upcoming period of time or a set of pictures over which the CM are applicable; and decode a portion of the bitstream based on the granularity type syntax element and the period type syntax element.

In another example, a method for processing video data is provided. The method includes: obtaining a bitstream; retrieving a granularity type syntax element associated with the bitstream, the granularity type syntax element specifying a type of granularity of one or more pictures over which complexity metrics (CM) associated with the bitstream are applicable; retrieving a period type syntax element associated with the bitstream, the period type syntax element indicating an upcoming period of time or a set of pictures over which the CM are applicable; and decoding a portion of the bitstream based on the granularity type syntax element and the period type syntax element.

In another example, a non-transitory computer-readable medium is provided that has instructions that, when executed by one or more processors, cause the one or more processors to: obtain a bitstream; retrieve a granularity type syntax element associated with the bitstream, the granularity type syntax element specifying a type of granularity of one or more pictures over which complexity metrics (CM) associated with the bitstream are applicable; retrieve a period type syntax element associated with the bitstream, the period type syntax element indicating an upcoming period of time or a set of pictures over which the CM are applicable; and decode a portion of the bitstream based on the granularity type syntax element and the period type syntax element.

In another example, an apparatus for processing video data is provided. The apparatus includes: means for obtaining a bitstream; means for retrieving a granularity type syntax element associated with the bitstream, the granularity type syntax element specifying a type of granularity of one or more pictures over which complexity metrics (CM) associated with the bitstream are applicable; means for retrieving a period type syntax element associated with the bitstream, the period type syntax element indicating an upcoming period of time or a set of pictures over which the CM are applicable; and means for decoding a portion of the bitstream based on the granularity type syntax element and the period type syntax element.

In another example, an apparatus for processing video data is provided. The apparatus includes: at least one memory; and at least one processor (e.g., implemented in circuitry) coupled to the at least one memory, the at least one processor being configured to: obtain video data; generate, for a bitstream, a granularity type syntax element specifying a type of granularity of one or more pictures over which complexity metrics (CM) associated with the bitstream are applicable; generate, for the bitstream, a period type syntax element associated with the bitstream, the period type syntax element indicating an upcoming period of time or a set of pictures over which the CM are applicable; generate the bitstream associated with the video data, the bitstream including the granularity type syntax element and the period type syntax element; and output the generated bitstream.

In another example, a method for processing video data is provided. The method includes: obtaining video data; generating, for a bitstream, a granularity type syntax element specifying a type of granularity of one or more pictures over which complexity metrics (CM) associated with the bitstream are applicable; generating, for the bitstream, a period type syntax element associated with the bitstream, the period type syntax element indicating an upcoming period of time or a set of pictures over which the CM are applicable; generating the bitstream associated with the video data, the bitstream including the granularity type syntax element and the period type syntax element; and outputting the generated bitstream.

In another example, a non-transitory computer-readable medium is provided that has instructions that, when executed by one or more processors, cause the one or more processors to: obtain video data; generate, for a bitstream, a granularity type syntax element specifying a type of granularity of one or more pictures over which complexity metrics (CM) associated with the bitstream are applicable; generate, for the bitstream, a period type syntax element associated with the bitstream, the period type syntax element indicating an upcoming period of time or a set of pictures over which the CM are applicable; generate the bitstream associated with the video data, the bitstream including the granularity type syntax element and the period type syntax element; and output the generated bitstream.

In another example, an apparatus for processing video data is provided. The apparatus includes: means for obtaining video data; means for generating, for a bitstream, a granularity type syntax element specifying a type of granularity of one or more pictures over which complexity metrics (CM) associated with the bitstream are applicable; means for generating, for the bitstream, a period type syntax element associated with the bitstream, the period type syntax element indicating an upcoming period of time or a set of pictures over which the CM are applicable; means for generating the bitstream associated with the video data, the bitstream including the granularity type syntax element and the period type syntax element; and means for outputting the generated bitstream.

According to at least one other example, an apparatus is provided for processing video data, including at least one memory and one or more processors (e.g., implemented in circuitry) coupled to the memory. The one or more processors are configured to: obtain a bitstream; and retrieve a granularity type syntax element associated with the bitstream, the granularity type syntax element specifying a type of granularity over which complexity metrics (CM) associated with the bitstream are applicable.

According to at least one other example, a non-transitory computer-readable medium is provided that includes instructions which, when executed by one or more processors, cause the one or more processors to: obtain a bitstream; and retrieve a granularity type syntax element associated with the bitstream, the granularity type syntax element specifying a type of granularity over which complexity metrics (CM) associated with the bitstream are applicable.

According to at least one other example, an apparatus is provided for processing video data, including: means for obtaining a bitstream; and means for retrieving a granularity type syntax element associated with the bitstream, the granularity type syntax element specifying a type of granularity over which complexity metrics (CM) associated with the bitstream are applicable.

In some aspects, a value of the granularity type syntax element specifies that the CM are applicable to a picture of the bitstream.

In some aspects, a value of the granularity type syntax element specifies that the CM are applicable to a slice of the bitstream.

In some aspects, a value of the granularity type syntax element specifies that the CM are applicable to a tile of the bitstream.

In some aspects, a value of the granularity type syntax element specifies that the CM are applicable to a subpicture of the bitstream.

In some aspects, a value of the granularity type syntax element specifies that the CM are applicable to a scalable layer of the bitstream.

In some aspects, a value of the granularity type syntax element specifies that the CM are applicable to a Coding Tree Unit (CTU) row of the bitstream.

In some aspects, the method, apparatuses, and non-transitory computer-readable medium described above can include retrieving a period type syntax element associated with the bitstream, the period type syntax element specifying a type of an upcoming period over which the CM are applicable.

In some aspects, the method, apparatuses, and non-transitory computer-readable medium described above can include retrieving a picture level CM syntax structure associated with the bitstream, the picture level CM syntax structure specifying complexity metrics for one or more pictures over a period.

In some aspects, the method, apparatuses, and non-transitory computer-readable medium described above can include retrieving a granularity level CM syntax structure associated with the bitstream, the granularity level CM syntax structure specifying granularity level complexity metrics for one or more entities over a period. In some aspects, the one or more entities include at least one of a slice, a tile, a subpicture, and a layer.

In some aspects, the method, apparatuses, and non-transitory computer-readable medium described above can include retrieving a subpicture syntax element associated with the bitstream, the subpicture syntax element indicating a subpicture identifier (ID) is signaled in the CM when a period is over multiple pictures.

In some aspects, the method, apparatuses, and non-transitory computer-readable medium described above can include retrieving a coding tree block (CTB) number syntax element associated with the bitstream, the CTB number syntax element indicating a total number of coding tree luma blocks over a period may be signaled in CM when the type of granularity is equal to a slice or a tile and a period is over multiple pictures.

In some aspects, the method, apparatuses, and non-transitory computer-readable medium described above can include retrieving an average coding tree block (CTB) number syntax element associated with the bitstream, the average CTB number syntax element indicating an average number of CTBs or 4×4 blocks per granularity per picture.

In some aspects, intra-coded block statistics are signaled in association with at least a portion of the bitstream when there are intra-coded blocks available in at least the portion the bitstream.

In some aspects, inter-coded block statistics are signaled in association with at least a portion of the bitstream when there are inter-coded blocks available in at least the portion the bitstream.

In some aspects, the method, apparatuses, and non-transitory computer-readable medium described above can include retrieving one or more quality recovery metrics associated with one or more granularity segments of the bitstream. In some aspects, the one or more granularity segments of the bitstream include at least one of a slice, a tile, and a subpicture.

In some aspects, the method, apparatuses, and non-transitory computer-readable medium described above can include: receiving supplemental enhancement information (SEI) message; and retrieving the granularity type syntax element from the SEI message.

In some aspects, the method, apparatuses, and non-transitory computer-readable medium described above can include determining an operating frequency of the apparatus based on the CM associated with the bitstream.

In some aspects, the apparatus includes a decoder.

According to at least one other example, a method of processing video is provided, including: obtaining video data; generating a bitstream associated with the video data; and generating, for the bitstream, a granularity type syntax element specifying a type of granularity over which complexity metrics (CM) associated with the bitstream are applicable.

According to at least one other example, an apparatus is provided for processing video data, including at least one memory and one or more processors (e.g., implemented in circuitry) coupled to the memory. The one or more processors are configured to: obtain video data; generate a bitstream associated with the video data; and generate, for the bitstream, a granularity type syntax element specifying a type of granularity over which complexity metrics (CM) associated with the bitstream are applicable.

According to at least one other example, a non-transitory computer-readable medium is provided that includes instructions which, when executed by one or more processors, cause the one or more processors to: obtain video data; generate a bitstream associated with the video data; and generate, for the bitstream, a granularity type syntax element specifying a type of granularity over which complexity metrics (CM) associated with the bitstream are applicable.

According to at least one other example, an apparatus is provided for processing video data, including: means for obtaining video data; means for generating a bitstream associated with the video data; and means for generating, for the bitstream, a granularity type syntax element specifying a type of granularity over which complexity metrics (CM) associated with the bitstream are applicable.

In some aspects, a value of the granularity type syntax element specifies that the CM are applicable to a picture of the bitstream.

In some aspects, a value of the granularity type syntax element specifies that the CM are applicable to a slice of the bitstream.

In some aspects, a value of the granularity type syntax element specifies that the CM are applicable to a tile of the bitstream.

In some aspects, a value of the granularity type syntax element specifies that the CM are applicable to a subpicture of the bitstream.

In some aspects, a value of the granularity type syntax element specifies that the CM are applicable to a scalable layer of the bitstream.

In some aspects, a value of the granularity type syntax element specifies that the CM are applicable to a Coding Tree Unit (CTU) row of the bitstream.

In some aspects, the method, apparatuses, and non-transitory computer-readable medium described above can include generating, for the bitstream, a period type syntax element specifying a type of an upcoming period over which the CM are applicable.

In some aspects, the method, apparatuses, and non-transitory computer-readable medium described above can include generating, for the bitstream, a picture level CM syntax structure specifying complexity metrics for one or more pictures over a period.

In some aspects, the method, apparatuses, and non-transitory computer-readable medium described above can include generating, for the bitstream, a granularity level CM syntax structure specifying specifies granularity level complexity metrics for one or more entities over a period. In some aspects, the one or more entities include at least one of a slice, a tile, a subpicture, and a layer.

In some aspects, the method, apparatuses, and non-transitory computer-readable medium described above can include generating, for the bitstream, a subpicture syntax element indicating a subpicture identifier (ID) is signaled in the CM when a period is over multiple pictures.

In some aspects, the method, apparatuses, and non-transitory computer-readable medium described above can include generating, for the bitstream, a coding tree block (CTB) number syntax element indicating a total number of coding tree luma blocks over a period may be signaled in CM when the type of granularity is equal to a slice or a tile and a period is over multiple pictures.

In some aspects, the method, apparatuses, and non-transitory computer-readable medium described above can include generating, for the bitstream, an average coding tree block (CTB) number syntax element indicating an average number of CTBs or 4×4 blocks per granularity per picture.

In some aspects, intra-coded block statistics are signaled in association with at least a portion of the bitstream when there are intra-coded blocks available in at least the portion the bitstream.

In some aspects, inter-coded block statistics are signaled in association with at least a portion of the bitstream when there are inter-coded blocks available in at least the portion the bitstream.

In some aspects, the method, apparatuses, and non-transitory computer-readable medium described above can include generating, for the bitstream, one or more quality recovery metrics associated with one or more granularity segments of the bitstream.

In some aspects, the one or more granularity segments of the bitstream include at least one of a slice, a tile, and a subpicture.

In some aspects, the method, apparatuses, and non-transitory computer-readable medium described above can include: generating supplemental enhancement information (SEI) message; and including the granularity type syntax element in the SEI message.

In some aspects, the method, apparatuses, and non-transitory computer-readable medium described above can include storing the bitstream.

In some aspects, the method, apparatuses, and non-transitory computer-readable medium described above can include transmitting the bitstream.

In some aspects, the apparatus includes an encoder.

In some aspects, the device is, is part of, and/or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a camera, a personal computer, a laptop computer, a server computer, a vehicle or a computing device or component of a vehicle, a robotics device or system, a television, or other device. In some aspects, the device includes a camera or multiple cameras for capturing one or more images. In some aspects, the device includes a display for displaying one or more images, notifications, and/or other displayable data. In some aspects, the device can include one or more sensors (e.g., one or more inertial measurement units (IMUs), such as one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
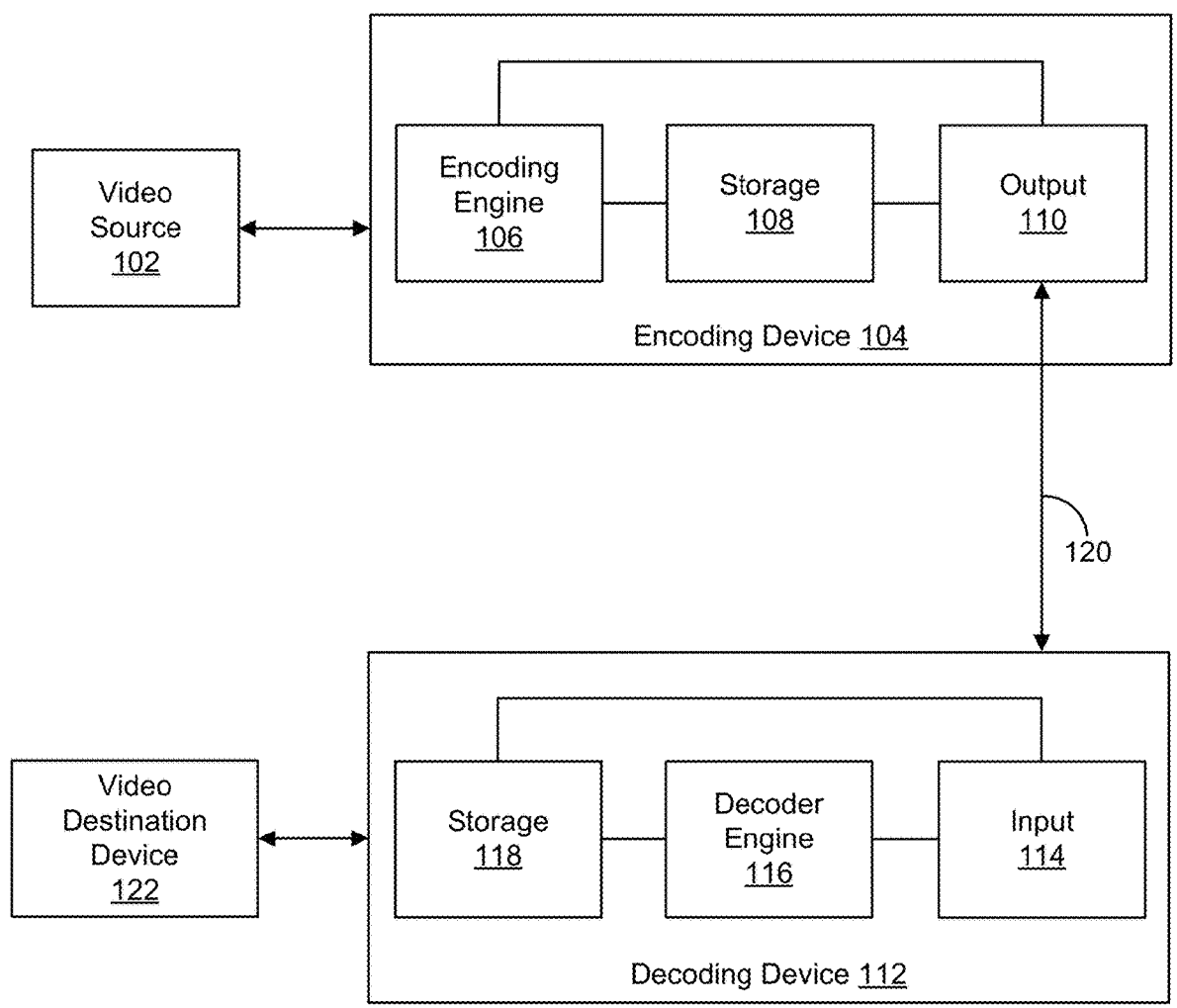
FIG. 1 is a block diagram illustrating an example of an encoding device and a decoding device, in accordance with some examples of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements and, along with control information, form a coded representation of a video sequence. In some instances, the video encoder may entropy code syntax elements, thereby further reducing the number of bits needed for their representation.

A video decoder may construct, using the syntax elements and control information discussed above, predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

The Energy Efficient Media Consumption (Green Metadata or Green MPEG) standard, with International Standard number ISO/IEC 23001-11 (which is hereby incorporated by reference in its entirety and for all purposes), specifies green metadata to facilitate reduction of energy usage during media consumption. The green metadata for energy-efficient decoding specifies two sets of information: Complexity Metrics (CM) metadata and Decoding Operation Reduction Request (DOR-Req) metadata. For instance, a decoder can use CM metadata to vary an operating frequency of a processor and thus reduce decoder power consumption. In one illustrative example, in a point-to-point video conferencing application, a remote encoder (which can generate an encoded bitstream) can receive a DOR-Req metadata and can use the DOR-Req metadata to modify the decoding complexity of the bitstream, thus reducing local decoder power consumption. By signaling the decoding complexity of the bitstream, the local decoder may be able to estimate an amount of power needed to decode the bitstream and potentially adapt the bitstream based on, for example, an amount of battery power remaining by requesting a less (or more) complex bitstream. In some cases, a supplemental enhancement information (SEI) message can be used to signal the green metadata in a bitstream (e.g., an AVC, HEVC, VVC, AV1, or other stream).

Green metadata was specified for AVC and HEVC in the 2nd edition of ISO/IEC 23001-11. New green metadata to support the VVC coder-decoder (codec) was proposed in the working draft of 3rd edition Green MPEG (MPEG MDS20584_WG03_N00330), and the CM were specified at various granularities. The syntax structure may be improved to support more granularity types over various period types. In addition, it may be problematic to signal CM for slice, tile, subpicture, or layer granularity using a single type. In some cases, such as for VVC, an encoder may divide a picture (e.g., frame) of a video being encoded into one or more portions, such as slices, tiles, subpictures, layers, etc. For example, a picture may be divided into one or more tiles and each tile may be divided into one or more blocks. A slice may include multiple tiles or multiple blocks within a tile. A subpicture may be one or more complete rectangular slices, with each rectangular slice covering a rectangular region of the picture. A subpicture may or may not be coded independently of other subpictures of the same picture.

Currently, a decoder, such as for AVC/HEVC, can use a number of slices and a number of tiles to identify whether the CM is calculated for a slice or tile. For example, when the number of slices is equal to the number of tiles, it is complicated to identify the CM granularity. Additionally, AVC and HEVC do not support subpicture granularity. It would be beneficial to define slice granularity and tile granularity in different types, along with defining subpicture and layer granularity.

VVC allows a subpicture to be replaced with a different subpicture within a coded layer video sequence (CLVS). A coded video sequences (CVS) may be a layer-wise set of CLVS. In some cases, the signaling to map the CMs to a particular subpicture using a subpicture identifier (ID) is necessary.

VVC also allows a resolution change in a CLVS. In some cases, it can be complicated to parse each slice header in order to derive the number of the total coding blocks over a period to interpret the normalized encoded statistics per slice or tile. Slice headers may be included with a slice and the slice header may convey information about an associated slice. Information that applies to all slices of a picture may be conveyed in a picture header. A syntax element to indicate total number of CTBs would be beneficial to simplify the derivation.

Currently, CM provides intra-coded block statistics when all blocks are intra-coded. It is possible that P and B slices may have more intra-coded blocks than inter-coded blocks, or that a P or B picture may have more intra-coded blocks than inter-coded blocks. As a result, CM may not accurately represent the complexity. Intra-coded blocks refer to a block which is predicted based on another block within the same picture, while inter-coded blocks refer to a block which is predicted based on another block from a different picture. A I-slice refers to a slice that includes intra-coded blocks and no inter-coded blocks. P and B slices can include both intra-coded blocks and inter-coded blocks.

Furthermore, instead of applying the quality metrics on the entire picture, the quality metrics may apply to individual subpictures respectively in VVC.

The present disclosure describes systems, apparatuses, methods, and computer-readable media (collectively referred to as "systems and techniques") for providing enhanced green metadata signaling, such as for improving Complexity Metrics (CM) signaling. For instance, in some cases, a granularity type indicator (e.g., a granularity type syntax element, such as granularity type) is provided to support various granularities, such as slice, tile, subpicture, scalable layer, and/or other granularity. In some examples, the semantics of a period type syntax element (e.g., period type) is modified.

In some cases, the systems and techniques provide improved complexity metrics (CM) signaling. For instance, the systems and techniques described herein provide the ability for video codecs (e.g., video encoders, video encoders, or combined video encoder-decoders) to specify a CM value that is applicable to portions of a picture, such as a slice, a tile, a subpicture, and/or a layer, for multiple pictures of the video. For example, as described previously, a subpicture may be defined for an encoded video. The subpicture includes a portion of a picture, such as the upper-right corner of the picture. A CM may be specified for the subpicture, where the CM is different from at least one other CM specified for a slice (or other portion) of the picture. The CM value associated with the subpicture may be defined once for multiple pictures, such as for 30 pictures from a first picture. The CM may be provided as a part of the metadata included with the encoded video. Allowing a single CM value to be specified for a subpicture across multiple frames helps reduce a size of the metadata for the encoded video while allowing for an increased flexibility and granularity for defining the CM for portions of the picture.

In some aspects, CM signaling changes associated with a resolution change are provided. In some cases, CM signaling changes with respect to intra-coded block statistics are provided. In some aspects, sub-picture quality metrics are provided.

The systems and techniques described herein can be applied to any of the existing video codecs, such as Versatile Video Coding (VVC), High Efficiency Video Coding (HEVC), Advanced Video Coding (AVC), VP9, the AV1 format/codec, and/or other video coding standard, codec, format, etc. in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enables parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning, QTBT partitioning, MTT partitioning, superblock partitioning, or other partitioning structure.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ¼-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, 5G New Radio (NR), Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As noted above, the Energy Efficient Media Consumption standard (ISO/IEC 23001-11) specifies green metadata to facilitate reduction of energy usage during media consumption. The green metadata includes Complexity Metrics (CM) metadata and Decoding Operation Reduction Request (DOR-Req) metadata. A decoder may use the CM metadata to help adjust an operating frequency of a processor performing the decoding to help reduce power consumption. As previously described, systems and techniques are described herein for improving green metadata, such as CM signaling. For example, it can be problematic to signal CM for slice, tile, and/or subframe granularity using a single type over multiple pictures. In some aspects, systems and techniques described herein improve the syntax structure for green metadata to support more granularity types (e.g., slice granularity, tile granularity, etc.), and in some cases over various period types. In some aspects, systems and techniques described herein provide signaling to map one or more CMs to a particular subpicture using a subpicture identifier (ID). In some aspects, systems and techniques described herein provide signaling (e.g., a syntax element) to indicate total number of blocks (e.g., CTBs or other block). In some cases, such signaling (indicating the total number of blocks) can simplify the derivation the number of the total coding blocks over a period to interpret the normalized encoded statistics per slice or tile. The signaling may be included in the CM metadata included with the encoded video. In some aspects, systems and techniques described herein provide signaling for intra-coded block statistics. In some cases, such intra-coded block statistics signaling can resolve issues that arise when CM provides intra-coded block statistics when all blocks are intra-coded (e.g., when P and B slices have more intra-coded blocks than inter-coded blocks, when a P or B picture has more intra-coded blocks than inter-coded blocks, etc.). In some aspects, systems and techniques described herein provide mechanisms for applying the quality metrics to individual portions of a picture (e.g., to individual subpicture) respectively, such as in VVC, instead of applying the quality metrics to the entire picture.

Various aspects of the Complexity Metrics (CM) signaling noted above will now be described. For instance, in some aspects, a granularity type indicator (e.g., a granularity type syntax element, such as granularity type) is provided to support various granularities (e.g., granularity segments), such as slice, tile, subpicture, scalable layer, and/or other granularity. For instance, the encoding device 104 may signal the granularity type indicator in or with a bitstream. The granularity type indicator may be used in combination with the period type syntax elements to support granularity CM signaling that applies for multiple pictures. In some examples, the semantics of a period type syntax element (e.g., period_type) is modified. In one illustrative example, CM signaling for VVC green metadata is provided in Table 2 below (with additions to ISO/IEC 23001-11 being shown between < > (e.g., <added language>):

TABLE 2

Syntax of VVC CMs

| | Size | Descriptor |
|---|---|---|
| period_type | 8 | unsigned integer |
| <granularity_type> | 8 | unsigned integer |
| if ( period_type == 2 ) { | | |
|    num_seconds | 16 | unsigned integer |
| } | | |
| else if ( period_type == 3 ) { | | |
|    num_pictures | 16 | unsigned integer |
| < } | | |
| if ( granularity_type ==0 ) { | | |
|    <picture_level_CMs( )> | | |
|    } | | |
| else { | | |
|    granularity_level_CMs( ) | | |
|    } | | |
| } > | | |
| ... | | | period_type syntax element (e.g., variable) specifies the type of upcoming period over which the complexity metrics are applicable and values for the period_type syntax element may be defined (as an illustrative example) in the Table 3 below:

TABLE 3 specification of period_type for VVC

| Value | Description |
|---|---|
| 0x00 | complexity metrics are applicable to a single picture |
| 0x01 | complexity metrics are applicable to all pictures in decoding order, up to (but not including) the picture containing the next I-slice |
| 0x02 | complexity metrics are applicable to all pictures over a specified time interval in seconds |
| 0x03 | complexity metrics are applicable over a specified number of pictures counted in decoding order |
| 0x04-0xFF | reserved | granularity_type syntax element specifies the type of granularity over which the complexity metrics are applicable and values for the granularity_type syntax element may be defined (as an illustrative example) in the Table 4 below:

TABLE 4 specification of granularity_type for VVC

Figure 2:
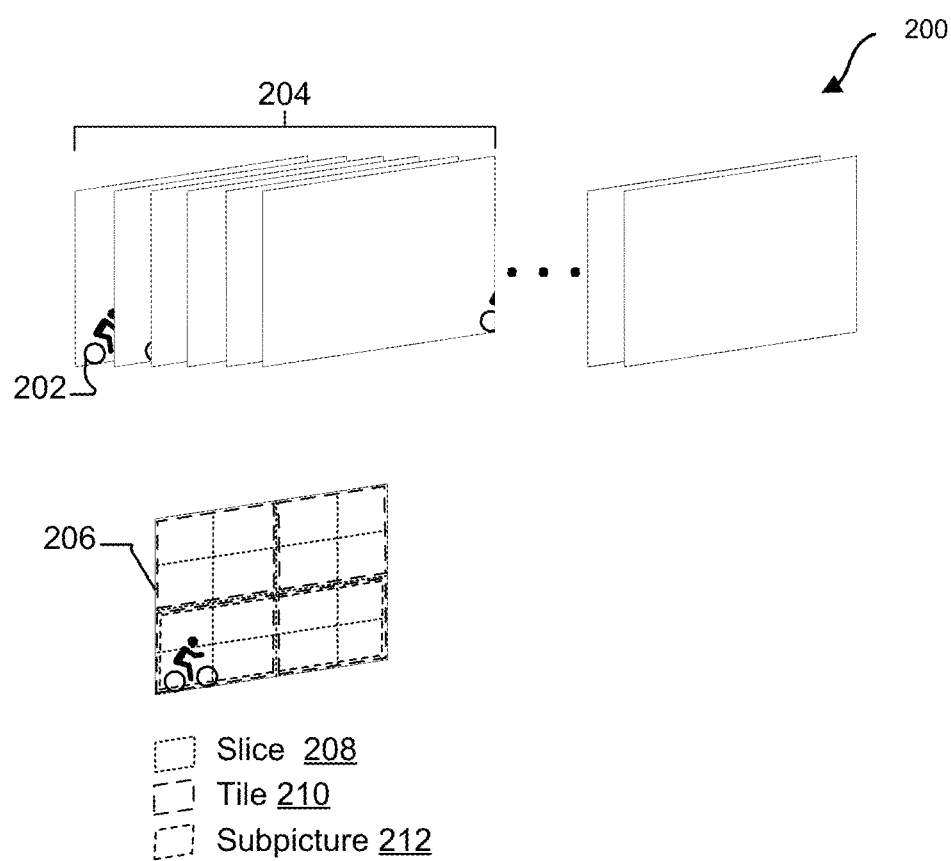
FIG. 2 is a diagram illustrating an example use of a granularity level complexity metrics for video pictures.

| Value | Description |
|---|---|
| 0x00 | Picture granularity where CM is applicable to a picture |
| 0x01 | Slice granularity where CM is applicable to a slice |
| 0x02 | Tile granularity where CM is applicable to a tile |
| 0x03 | Subpicture granularity where CM is applicable to a subpicture |
| 0x04 | Scalable layer granularity where CM is applicable to a scalable layer |
| 0x05 | CTU row granularity where CM is applicable to a CTU row |
| 0x07-0xFF | Reserved | picture_level_CMs syntax structure specifies the complexity metrics for a particular picture over a period. The picture_level_CMs syntax structure can be referred to herein as a picture level CM syntax structure.

granularity_level_CMs syntax structure specifies the granularity level complexity metrics for each entity such as slice, tile, subpicture, or layer over a period. The granularity_level_CMs syntax structure can be referred to herein as a granularity level CM syntax structure FIG. 2 is a diagram illustrating an example use of a granularity level CM for video pictures 200 (also referred to as frames or images), in accordance with aspects of the present disclosure. The video pictures 200 include a bicyclist 202 in motion which rides across a view of the video pictures 200 and the bicyclist 202 appears in a set of pictures 204 of the video pictures 200. Each picture of the video pictures 200 may be divided (e.g., by an encoder such as the encoding device 104) into one or more portions, such as slices, tiles, subpictures, layers, etc. Picture 206, of the set of pictures 204, is shown divided into sixteen slices 208, four tiles 210, and one subpicture 212, where each tile 210 includes four slices 208 and the subpicture 212 includes two tiles 210 on the lower portion of the picture.

In some cases, being able to specify both a period type and granularity type to a decoding device (e.g., the decoding device 112) allows for greater flexibility and reduced signaling by allowing a granularity level CM to be defined once for a slice, tile, subpicture, or layer for multiple pictures. For example, rather than having to define a granularity level CM for a subpicture of each picture, an encoding device (e.g., the encoding device 104) may apply a single granularity level CM to the subpicture of all of the pictures in a specified time interval. In the video pictures 200, as the bicyclist 202 is in motion in the video, the areas in which the bicyclist 202 appears may be more complex to encode/decode as compared to other areas of the set of pictures 204 (which have less or no motion), and a different CM may be specified for those areas using a granularity level CM. For example, a granularity level CM may be specified once for the subpicture 212 area (e.g., granularity_type=3) for a number of pictures, such as the six pictures of the set of pictures 204 (e.g., num_pictures=6). By allowing a granularity level CM to be set for a specific time interval (e.g., a set number of pictures, a time period, etc.), a single granularity level CM may be used in the metadata corresponding to a first picture of the set of pictures 204 and this granularity level CM may apply to all pictures in the set of pictures 204, based on the specified time interval. After the set of pictures 204 the granularity level CM for the subpicture 212 may be adjusted as the bicyclist 202 is no longer in the area covered by the subpicture 212 and the area may now be less complex to encode/decode. Similarly, multiple, possibly different, granularity level CMs may be specified for any number of slices, tiles, subpictures, or layers in a picture, where each granularity level CM may apply over a different upcoming period (e.g., a single picture, all pictures for a specified time interval, a number of pictures, all pictures up to a picture containing a next slice, etc.).

In some aspects, an encoding device (e.g., the encoding device 104) may specify a CM value that is applicable to portions of a picture, such as a slice, a tile, a subpicture, and/or a layer, for multiple pictures of the video. For instance, according to some aspects, the encoding device may generate and signal subpicture CM signaling. The subpicture CM signaling indicates which subpictures, for one or more pictures, to which the CM applies. In one example, for the subpicture granularity, a syntax element (e.g., referred to as a subpicture syntax element) indicates that a subpicture ID is signaled in the CM metadata when the period is over multiple pictures (e.g., where the granularity level CM applies to multiple pictures). An example is shown in Table 5 below:

TABLE 5 subpicture CMs

| | Size | Descriptor |
|---|---|---|
| ... | | |
| if ( granularity_type == 0x03 && period_type > 0 ) { | | |
|   num_subpics_minus1 | 16 | Unsigned integer |
|   for (i = 0; i <= num_subpics_minus1; i++) | | |
|     subpic_id[ i ] | 16 | Unsigned integer |
|     subpic_CM( i ) | | |
|   } | | |
| ... | | |
| } | | | subpic_id[i] specifies the subpicture ID of associated complexity metric (CM).

subpic_CM is the i-th subpicture complexity metrics structure.

In some cases, subpic_id and/or subpic_CM(i) may be replaced by one or more syntax elements which refer(s) to a segment address. In some cases, a segment may be a slice, a tile, or a subpicture this segment address may identify, for example a specific slice, tile, and/or subpicture of a picture. As an example, segment address[t] may indicate an address of a $t^{th}$ segment. Thus, where the granularity type specifies subpicture granularity, the segment address[t] may indicate the subpicture ID of the $t^{th}$ subpicture.

In some cases, aspects are associated with a resolution change. For instance, in VVC, resolution change within a coded layer video sequence (CLVS) is applicable to picture, slice, and tile granularity, but is not applicable at the subpicture granularity. According to some aspects, a syntax element (e.g., referred to as a coding tree block (CTB) number syntax element) indicating a total number of coding tree luma blocks over a period can be signaled in the green metadata (e.g., in CM syntax table as one or more syntax elements, such as num_ctbs_minus1 in Table 6 below), such as when the granularity type is equal to slice (e.g., 0x01 from Table 4) or tile (e.g., 0x02 from Table 4) and the period type is over multiple pictures. An example is shown in Table 6 below:

TABLE 6 complexity metrics syntax

| | Size | Descriptor |
|---|---|---|
| ... | | |
| if ( (granularity_type == 0x01 \|\| granularity_type == 0x02) && | | |
|   num_ctbs_minus1 | 16 | Unsigned integer |
|   granularity_level_CMs( ) | | |
|   } | | |
| ... | | |
| } | | | num_ctbs_minus1 specifies the total number of coding tree blocks of the associated complexity metrics over a period.

In some aspects, an alternative syntax element (e.g., avg_number_ctbs_minus1) may indicate the average number of CTBs or 4×4 blocks (or other sized blocks) per granularity per picture instead of the total number of CTBs over period to reduce the overhead. Such a syntax element can be referred to as an average CTB number syntax element.

In some cases, aspects are associated with intra-coded block statistics. For example, the current green metadata CM syntax only signals the intra-coded block statistics when all blocks are intra-coded blocks (e.g., portion_intra_predicted_blocks_area==255). Table 7 below shows proposed CM signaling changes, where additions are shown between < > (e.g., <added language>) and deletions are shown with stricken-through text (e.g.,). The intra-coded block statistics are signaled when there are intra-coded blocks available. The inter-coded block statistics are signaled when there are inter-coded blocks available.

TABLE 7

Proposed CM syntax structure

| | Size | Descriptor |
|---|---|---|
| ... | | |
| portion_intra_predicted_blocks_area | 8 | unsigned integer |
| if ( portion_intra_predicted_blocks_area <!= 0> ~~== 255~~ ) { | | |
|   portion_planar_blocks_in_intra_area | 8 | unsigned integer |
|   portion_dc_blocks_in_intra_area | 8 | unsigned integer |

TABLE 7-continued

| Proposed CM syntax structure | Size | Descriptor |
|---|---|---|
|     portion_angular_hv_blocks_in_intra_area | 8 | unsigned integer |
|     portion_mip_blocks_in_intra_area | 8 | unsigned integer |
| } | | |
| ~~else~~<if ( portion_intra_predicted_blocks_area != 255 )> { | | |
|     portion_bi_and_gpm_predicted_blocks_area | 8 | unsigned integer |
| } | | |
| portion_deblocking_instances | 8 | unsigned integer |
| portion_sao_filtered_blocks | 8 | unsigned integer |
| portion_alf_filtered_blocks | 8 | unsigned integer |
| ... | | |
| } | | |

Examples of definitions of the various syntax elements from Table 7 are provided below for VVC:

portion_intra_predicted_blocks_area indicates the portion of area covered by intra predicted blocks in the pictures of the specified period using 4-samples granularity and is defined as follows:

$$\text{portion\_intra\_predicted\_blocks\_area} = \text{Floor}\left(\frac{NumIntraPredictedBlocks}{TotalNum4BlocksInPeriod} * 255\right) \quad (5-82)$$

NumIntraPredictedBlocks is the number of intra predicted blocks in the specified period using 4-samples granularity. At the encoder side, it is computed as follows:

$$NumIntraPredictedBlocks = \sum_{X=4,8,16,32,64,128,256,512,1024,2048,4096} X/4 * \text{NumIntraPredictedBlocks\_X} \quad (5-83)$$

Where NumIntraPredictedBlocks_X is the number of blocks using intra prediction, for number of samples from X=4, 8, 16, 32, 64, 128, 256, 512, 1024, 2048, 4096, in the specified period.

NumIntraPredictedBlocks is derived from portion_intra_predicted_blocks_area and TotalNum4BlocksInPeriod in the decoder.

portion_planar_blocks_in_intra_area indicates the portion of intra planar predicted blocks area in the intra predicted area in the specified period and is defined as follows:

$$\text{portion\_planar\_blocks\_in\_intra\_area} = \text{Floor}\left(\frac{NumPlanarPredictedBlocks}{NumIntraPredictedBlocks} * 255\right) \quad (5-84)$$

When not present, is equal to 0.

NumPlanarPredictedBlocks is the number of intra planar predicted blocks in the specified period using 4-samples granularity. At the encoder side, it is computed as follows:

$$NumPlanarPredictedBlocks = \sum_{X=4,8,16,32,64,128,256,512,1024,2048,4096} X/4 * \text{NumIntraPlanarBlocks\_X} \quad (5-85)$$

Where NumIntraPlanarBlocks_X is the number of blocks using intra planar prediction, for number of samples from X=4, 8, 16, 32, 64, 128, 256, 512, 1024, 2048, 4096, in the specified period.

NumPlanarPredictedBlocks is derived from portion_planar_blocks_in_intra_area and NumIntraPredictedBlocks in the decoder.

portion_dc_blocks_in_intra_area indicates the portion of intra DC predicted blocks area in the intra predicted area in the specified period and is defined as follows:

$$\text{portion\_dc\_blocks\_in\_intra\_area} = \text{Floor}\left(\frac{NumDcPredictedBlocks}{NumIntraPredictedBlocks} * 255\right) \quad (5-86)$$

When not present, is equal to 0.

NumDcPredictedBlocks is the number of intra DC predicted blocks in the specified period using 4-samples granularity. At the encoder side, it is computed as follows:

$$NumDcPredictedBlocks = \sum_{X=4,8,16,32,64,128,256,512,1024,2048,4096} X/4 * \text{NumIntraDcBlocks\_X} \quad (5-87)$$

Where NumIntraDcBlocks_X is the number of blocks using intra DC prediction, for number of samples from X=4, 8, 16, 32, 64, 128, 256, 512, 1024, 2048, 4096, in the specified period.

NumDcPredictedBlocks is derived from portion_dc_blocks_in_intra_area and NumIntraPredictedBlocks in the decoder.

portion_angular_hv_blocks_in_intra_area (also referred to as portion_hv_blocks_in_intra_area) indicates the portion of intra horizontal and vertical directional predicted blocks area in the intra predicted area in the specified period and is defined as follows:

$$\text{portion\_hv\_blocks\_in\_intra\_area} = \text{Floor}\left(\frac{NumHvPredictedBlocks}{NumIntraPredictedBlocks} * 255\right) \quad (5-88)$$

When not present, is equal to 0.

NumHvPredictedBlocks is the number of intra horizontal and vertical directional predicted blocks in the specified period using 4-samples granularity. At the encoder side, it is computed as follows:

$$NumHvPredictedBlocks = \sum_{X=4,8,16,32,64,128,256,512,1024,2048,4096} X/4 * \text{NumIntraHvBlocks\_X} \quad (5-89)$$

Where NumIntraHvBlocks_X is the number of blocks using intra horizontal and vertical directional prediction, for number of samples from X=4, 8, 16, 32, 64, 128, 256, 512, 1024, 2048, 4096, in the specified period.

NumHvPredictedBlocks is derived from portion_hv_blocks_in_intra_area and NumIntraPredictedBlocks in the decoder.

portion_mip_blocks_in_intra_area indicates the portion of intra MIP predicted blocks area in the intra predicted area in the specified period and is defined as follows:

$$\text{portion\_mip\_blocks\_in\_intra\_area} = \text{Floor}\left(\frac{NumMipPredictedBlocks}{NumIntraPredictedBlocks} * 255\right) \quad (5-90)$$

When not present, is equal to 0.

NumMipPredictedBlocks is the number of intra MIP predicted blocks in the specified period using 4-samples granularity. At the encoder side, it is computed as follows:

$$NumMipPredictedBlocks = \sum_{X=4,8,16,32,64,128,256,512,1024,2048,4096} X/4 * \text{NumIntraMipBlocks\_X} \quad (5-91)$$

Where NumIntraMipBlocks_X is the number of blocks using intra MIP prediction, for number of samples from X=4, 8, 16, 32, 64, 128, 256, 512, 1024, 2048, 4096, in the specified period.

NumMipPredictedBlocks is derived from portion_mip_blocks_in_intra_area and NumIntraPredictedBlocks in the decoder.

portion_bi_and_gpm_predicted_blocks_area indicates the portion of area covered by inter bi-predicted or GPM-predicted blocks in the pictures of the specified period using 4-samples granularity and is defined as follows:

$$\text{portion\_bi\_and\_gpm\_predicted\_blocks\_area} = \text{Floor}\left(\frac{NumBiAndGpmPredictedBlocks}{TotalNum4BlocksInPeriod} * 255\right) \quad (5-92)$$

NumBiAndGpmPredictedBlocks is the number of inter bi-predicted and GPM-predicted blocks in the specified period using 4-samples granularity. At the encoder side, it is computed as follows:

$$NumBiAndGpmPredictedBlocks = \sum_{X=4,8,16,32,64,128,256,512,1024,2048,4096} X/4 * \text{NumBiAndGpmPredictedBlocks\_X} \quad (5-93)$$

Where NumBiPredictedXBlocks are the number of blocks using inter bi-prediction or GPM prediction, for number of samples from X=4, 8, 16, 32, 64, 128, 256, 512, 1024, 2048, 4096, in the specified period.

NumBiPredictedXBlocks is derived from portion_bi_and_gpm_predicted_blocks_area and TotalNum4BlocksInPeriod in the decoder.

portion_deblocking_instances indicates the portion of deblocking filtering instances, as defined in the Terms and definitions of this document, in the specified period and is defined as follows:

$$\text{portion\_deblocking\_instances} = \text{Floor}\left(\frac{NumDeblockingInstances}{MaxNumDeblockingInstances} * 255\right) \quad (5-94)$$

NumDeblockingInstances is the number of deblocking filtering instances in the specified period. It is derived from portion_deblocking_instances and MaxNumDeblockingInstances in the decoder.

portion_sao_filtered_blocks indicates the portion of SAO filtered blocks in the specified period using 4-samples granularity. At the encoder side, it is computed as follows:

$$\text{portion\_sao\_filtered\_blocks} = \text{Floor}\left(\frac{NumSaoFilteredBlocks}{TotalNum4BlocksInPeriod} * 255\right) \quad (5-95)$$

NumSaoFilteredBlocks is the number of SAO filtered blocks in the specified period using 4-samples granularity. It is derived from portion_sao_filtered_blocks, TotalNum4BlocksInPeriod in the decoder.

portion_alf_filtered_blocks indicates the portion of ALF filtered blocks in the specified period using 4-samples granularity. At the encoder side, it is computed as follows:

$$\text{portion\_alf\_filtered\_blocks} = \text{Floor}\left(\frac{NumAlfFilteredBlocks}{TotalNum4BlocksInPeriod} * 255\right) \quad (5-96)$$

NumAlfFilteredBlocks is the number of ALF filtered blocks in the specified period using 4-samples granularity. It is derived from portion_alf_filtered_blocks, TotalNum4BlocksInPeriod in the decoder.

In some cases, aspects are associated with sub-picture quality metrics. For instance, the quality recovery metrics may apply to each granularity segment. In some cases, a segment may be a slice, a tile, or a subpicture. Table 8 provides an example of subpicture-based metrics for quality recovery proposed for green MPEG, where additions are shown between < > (e.g., <added language>).

TABLE 8 quality recovery metrics of green metadata

| | Descriptor |
|---|---|
| green_metadata( payload_size ) | |
| green_metadata_type | u(8) |
| switch (green_metadata_type ) { | |
|   case 0: | |
|     ... | |
|     break; | |
|   case 1: | |
|     xsd_metric_number_minus1 | u(4) |
|     for ( i=0; i<= xsd_metric_number_minus1; i++ ) { | |
|       xsd_metric_type[ i ] | u(8) |
|       <xsd_subpic_number_minus1> | ue(v) |
|       for ( j=0; i<= xsd_subpic_number_minus1; | |

TABLE 8-continued quality recovery metrics of green metadata

| | Descriptor |
|---|---|
|     j++ ) { | |
|         xsd_metric_value[ i ]<[ j ]> | u(16) |
|         } | |
|     } | |
|     break; | |
|   default: | |
| } | | xsd_subpic_number_minus1 specifies the number of subpictures available in the associated picture. When xsd_subpic_number_minus1 is equal to 0, the quality recovery metric applies to the entire picture.

xsd_metric_type[i] indicates the type of the objective quality metric for the i-th objective quality metric.

xsd_metric_value[i][j] contains the value of the $i^{th}$ objective quality metric for the associated $j^{th}$ subpicture.

Current quality metrics describe the quality of the last picture of each segment. Aspects describe herein allow an SEI message to carry the quality metrics describing the quality of an associated picture. For instance, an encoding device (e.g., encoding device 104 of FIG. 1 and FIG. 4) can add the quality metrics to an SEI message.

Figure 3:
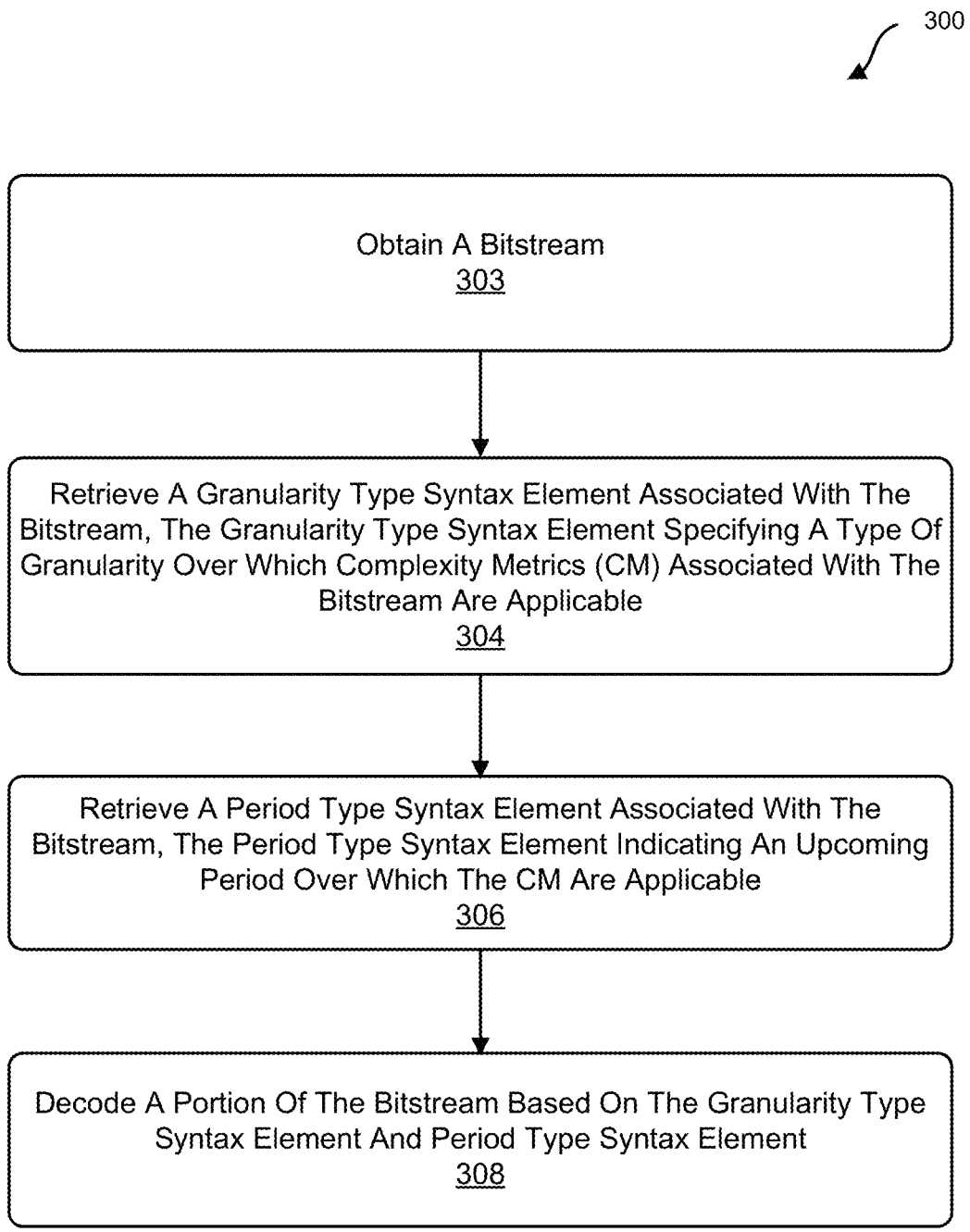
FIG. 3 is a flow diagram illustrating a technique for decoding encoded video, in accordance with aspects of the present disclosure.

FIG. 3 is a flow diagram illustrating a process for decoding encoded video 300, in accordance with aspects of the present disclosure. At operation 302, the process 300 can include obtaining a bitstream. At operation 304, the process 300 can include retrieving a granularity type syntax element associated with the bitstream, the granularity type syntax element specifying a type of granularity of one or more pictures over which complexity metrics (CM) associated with the bitstream are applicable. In some cases, a value of the granularity type syntax element specifies that the CM are applicable to a picture or a portion of the picture of the bitstream, the portion of the picture being less than an entirety of the picture. In some cases, a value of the granularity type syntax element specifies that the CM are applicable to at least one of a slice, a tile, a subpicture, a scalable layer, or a coding tree unit (CTU) row of the one or more pictures of the bitstream.

At operation 306, the process 300 can include retrieving a period type syntax element associated with the bitstream, the period type syntax element indicating an upcoming period of time or a set of pictures over which the CM are applicable. In some cases, the period type syntax element indicates at least one of a specified time interval for the upcoming period, a number of pictures for the upcoming period, that the upcoming period includes all pictures up to a picture including a next slice, or that the upcoming period includes a single picture. In some cases, the process 300 can also include retrieving a granularity level CM syntax structure associated with the bitstream, the granularity level CM syntax structure specifying granularity level complexity metrics for one or more granularity segments of the bitstream over the upcoming period. In some cases, the process 300 can further include retrieving an additional period type syntax element associated with the bitstream, the additional period type syntax element being associated with the granularity type syntax element, wherein the additional period type syntax element differs from the period type syntax element and decoding a portion of the bitstream based on the granularity type syntax element and the additional period type syntax element.

In some cases, the process 300 can also include retrieving at least one of: a subpicture syntax element associated with the bitstream, the subpicture syntax element indicating that a subpicture identifier (ID) is signaled when the CM applies to multiple pictures; a coding tree block (CTB) number syntax element associated with the bitstream, the CTB number syntax element indicating a total number of coding tree luma blocks over the upcoming period may be signaled in CM when the type of granularity is equal to a slice or a tile and the upcoming period is over multiple pictures; or an average coding tree block (CTB) number syntax element associated with the bitstream, the average CTB number syntax element indicating an average number of CTBs or 4×4 blocks per granularity per picture.

In some cases, for process 300, intra-coded block statistics are signaled in association with at least a portion of the bitstream when there are intra-coded blocks available in at least the portion the bitstream. In some cases, inter-coded block statistics are signaled in association with at least a portion of the bitstream when there are inter-coded blocks available in at least the portion the bitstream. In some cases, the process 300 can also include displaying at least the portion of the bitstream on a display. In some cases, the process 300 can further include determining an operating frequency of a device based on the CM associated with the bitstream.

At operation 308, the process 300 can include decoding a portion of the bitstream based on the granularity type syntax element and the period type syntax element. In some cases, the process 300 may be performed by one of a mobile device, a wearable device, an extended reality device, a camera, a personal computer, a vehicle, a robotic device, a television, or a computing device.

Figure 4:
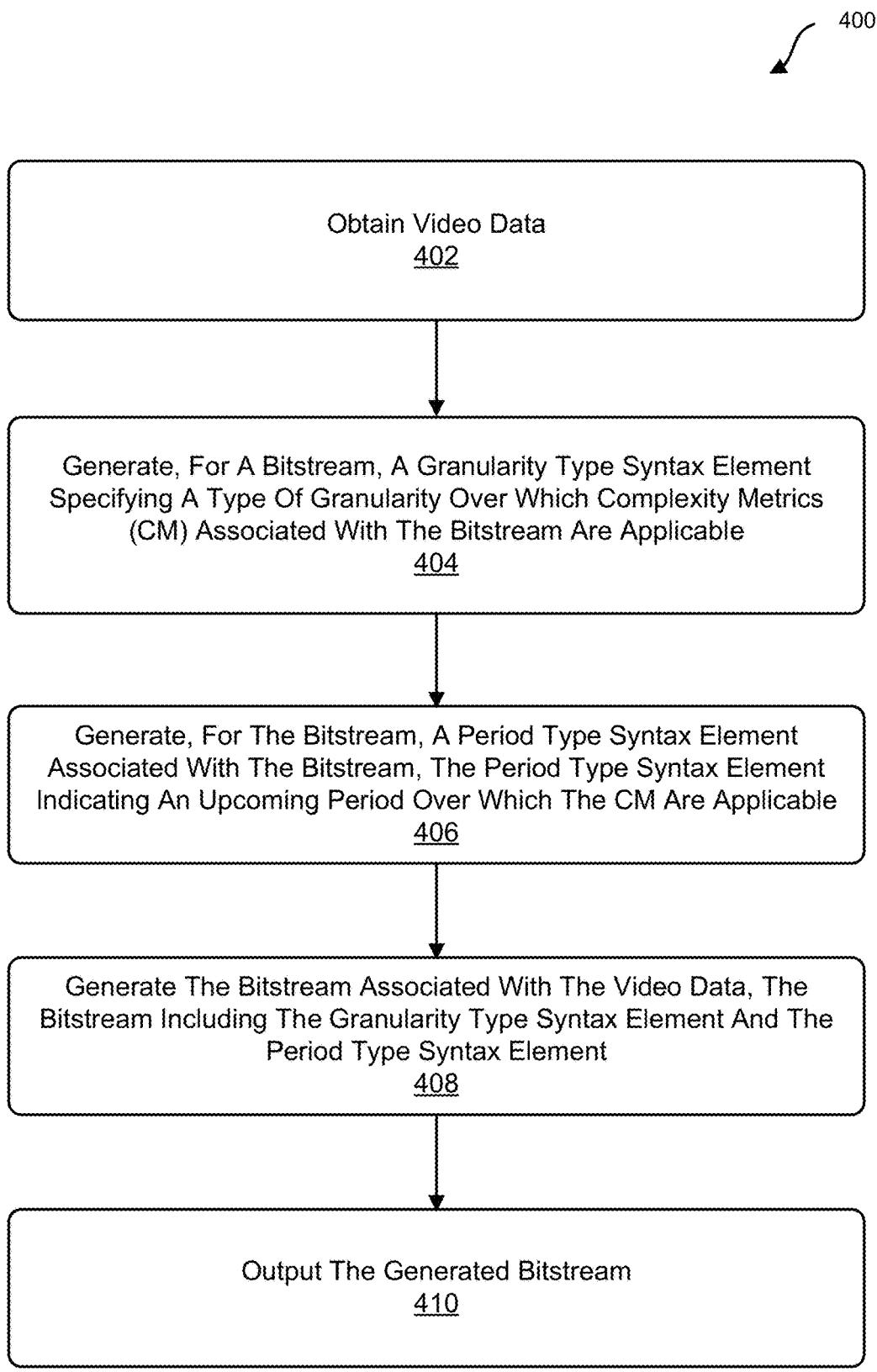
FIG. 4 is a flow diagram illustrating a technique for encoding video, in accordance with aspects of the present disclosure.

FIG. 4 is a flow diagram 400 illustrating a technique for encoding video, in accordance with aspects of the present disclosure. At operation 402, the process 400 can include obtaining video data. At operation 404, the process 400 can include generating, for a bitstream, a granularity type syntax element specifying a type of granularity of one or more pictures over which complexity metrics (CM) associated with the bitstream are applicable. In some cases, a value of the granularity type syntax element specifies that the CM are applicable to a picture or a portion of the picture of the bitstream, the portion of the picture being less than an entirety of the picture. In some cases, a value of the granularity type syntax element specifies that the CM are applicable to at least one of a slice, a tile, a subpicture, a scalable layer, or a coding tree unit (CTU) row of the one or more pictures of the bitstream.

At operation 406, the process 400 can include generating, for the bitstream, a period type syntax element associated with the bitstream, the period type syntax element indicating an upcoming period of time or a set of pictures over which the CM are applicable. In some cases, the period type syntax element indicates at least one of a specified time interval for the upcoming period, a number of pictures for the upcoming period, that the upcoming period includes all pictures up to a picture including a next slice, or that the upcoming period includes a single picture. In some cases, the period type syntax element indicates at least one of a specified time interval for the upcoming period, a number of pictures for the upcoming period, that the upcoming period includes all pictures up to a picture containing a next slice, or that the upcoming period includes a single picture.

In some cases, the process 400 can also include generating, for the bitstream, a granularity level CM syntax structure specifying specifies granularity level complexity metrics for one or more entities over the upcoming period. In some cases, the process 400 can further include generating, for the bitstream, an additional period type syntax element being associated with the granularity type syntax element, wherein the additional period type syntax element differs from the period type syntax element, and wherein the additional period type syntax element is for decoding a portion of the bitstream with the granularity type syntax element. In some cases, the process 400 can also include generating, for the bitstream at least one of: a subpicture syntax element associated with the bitstream, the subpicture syntax element indicating that a subpicture identifier (ID) is signaled when the CM applies to multiple pictures; a coding tree block (CTB) number syntax element associated with the bitstream, the CTB number syntax element indicating a total number of coding tree luma blocks over the upcoming period may be signaled in CM when the type of granularity is equal to a slice or a tile and the upcoming period is over multiple pictures; or an average coding tree block (CTB) number syntax element associated with the bitstream, the average CTB number syntax element indicating an average number of CTBs or 4×4 blocks per granularity per picture.

In some cases, for process 400, intra-coded block statistics are signaled in association with at least a portion of the bitstream when there are intra-coded blocks available in at least the portion the bitstream. In some cases, inter-coded block statistics are signaled in association with at least a portion of the bitstream when there are inter-coded blocks available in at least the portion the bitstream. In some cases, the process 400 may be performed by one of a mobile device, a wearable device, an extended reality device, a camera, a personal computer, a vehicle, a robotic device, a television, or a computing device.

In some implementations, the processes (or methods) described herein can be performed by a computing device or an apparatus, such as the system 100 shown in FIG. 1. For example, the processes can be performed by the encoding device 104 shown in FIG. 1 and FIG. 5, by another video source-side device or video transmission device, by the decoding device 112 shown in FIG. 1 and FIG. 6, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of one or more processes described herein.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 5:
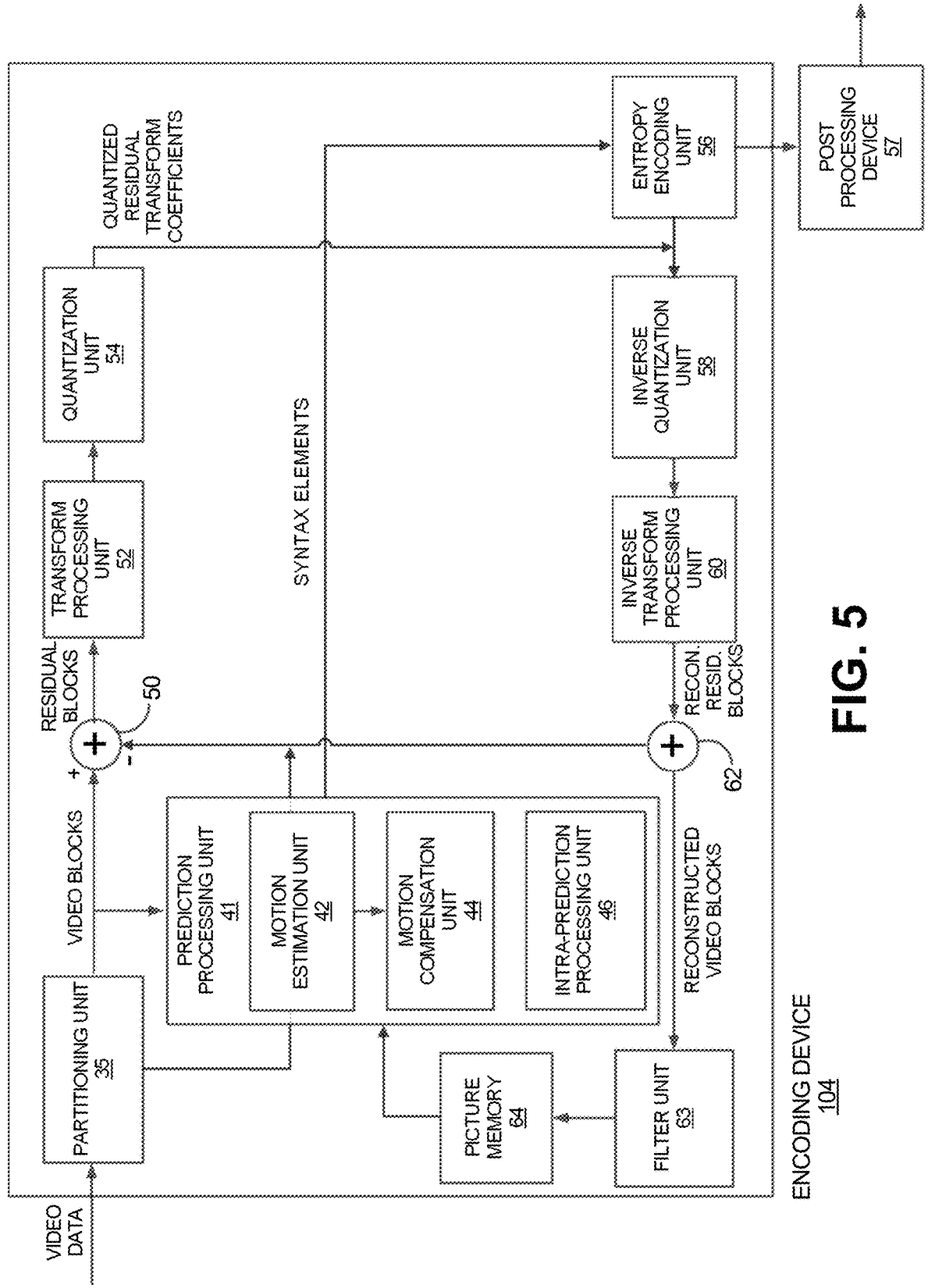
FIG. 5 is a block diagram illustrating an example video decoding device, in accordance with some examples of the disclosure.
Figure 6:
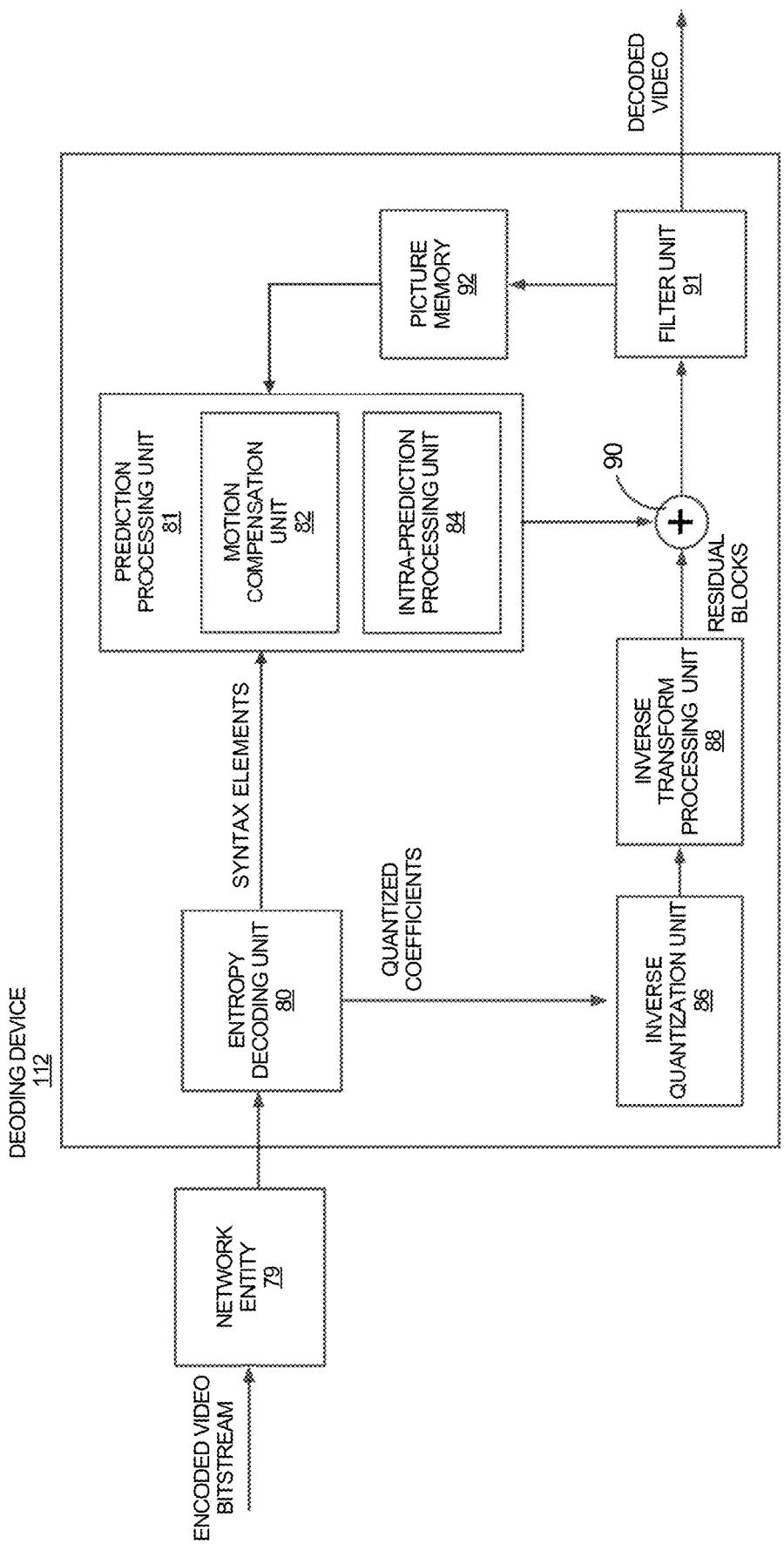
FIG. 6 is a block diagram illustrating an example video encoding device, in accordance with some examples of the disclosure.

Specific details of the encoding device 104 and the decoding device 112 are shown in FIG. 5 and FIG. 6, respectively. FIG. 5 is a block diagram illustrating an example encoding device 104 that may implement one or more of the techniques described in this disclosure. Encoding device 104 may, for example, generate the syntax elements and/or structures described herein (e.g., the syntax elements and/or structures of a green metadata, such as Complexity Metrics (CM), or other syntax elements and/or structures). Encoding device 104 may perform intra-prediction and inter-prediction coding of video blocks within video slices, tiles, sub-pictures, etc. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 5 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 5, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 5 represents an example of a video encoder configured to perform any of the techniques described herein. In some cases, some of the techniques of this disclosure may also be implemented by post processing device 57.

FIG. 6 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 5.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit of 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 6 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 6 represents an example of a video decoder configured to perform any of the techniques described herein.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing video data, comprising: at least one memory; and at least one processor coupled to the at least one memory, the at least one processor being configured to: obtain a bitstream; retrieve a granularity type syntax element associated with the bitstream, the granularity type syntax element specifying a type of granularity of one or more pictures over which complexity metrics (CM) associated with the bitstream are applicable; retrieve a period type syntax element associated with the bitstream, the period type syntax element indicating an upcoming period of time or a set of pictures over which the CM are applicable; and decode a portion of the bitstream based on the granularity type syntax element and the period type syntax element.

Aspect 2. The apparatus of claim 1, wherein a value of the granularity type syntax element specifies that the CM are applicable to a picture or a portion of the picture of the bitstream, the portion of the picture being less than an entirety of the picture.

Aspect 3. The apparatus of claim 1, wherein a value of the granularity type syntax element specifies that the CM are applicable to at least one of a slice, a tile, a subpicture, a scalable layer, or a coding tree unit (CTU) row of the one or more pictures of the bitstream.

Aspect 4. The apparatus of claim 1, wherein the period type syntax element indicates at least one of a specified time interval for the upcoming period, a number of pictures for the upcoming period, that the upcoming period includes all pictures up to a picture including a next slice, or that the upcoming period includes a single picture.

Aspect 5. The apparatus of claim 1, wherein the at least one processor is configured to retrieve a granularity level CM syntax structure associated with the bitstream, the granularity level CM syntax structure specifying granularity level complexity metrics for one or more granularity segments of the bitstream over the upcoming period.

Aspect 6. The apparatus of claim 1, wherein the at least one processor is configured to: retrieve an additional period type syntax element associated with the bitstream, the additional period type syntax element being associated with the granularity type syntax element, wherein the additional period type syntax element differs from the period type syntax element; and decode the portion of the bitstream based on the granularity type syntax element and the additional period type syntax element.

Aspect 7. The apparatus of claim 1, wherein the at least one processor is configured to retrieve at least one of: a subpicture syntax element associated with the bitstream, the subpicture syntax element indicating that a subpicture identifier (ID) is signaled when the CM applies to multiple pictures; a coding tree block (CTB) number syntax element associated with the bitstream, the CTB number syntax element indicating a total number of coding tree luma blocks over the upcoming period may be signaled in CM when the type of granularity is equal to a slice or a tile and the upcoming period is over multiple pictures; or an average coding tree block (CTB) number syntax element associated with the bitstream, the average CTB number syntax element indicating an average number of CTBs or 4×4 blocks per granularity per picture.

Aspect 8. The apparatus of claim 1, wherein intra-coded block statistics are signaled in association with at least a portion of the bitstream when there are intra-coded blocks available in at least the portion the bitstream.

Aspect 9. The apparatus of claim 1, wherein inter-coded block statistics are signaled in association with at least a portion of the bitstream when there are inter-coded blocks available in at least the portion the bitstream.

Aspect 10. The apparatus of claim 1, wherein the at least one processor is configured to determine an operating frequency of the apparatus based on the CM associated with the bitstream.

Aspect 11. The apparatus of claim 1, further comprising a display configured to display at least the portion of the bitstream.

Aspect 12. The apparatus of claim 1, wherein the apparatus is one of a mobile device, a wearable device, an extended reality device, a camera, a personal computer, a vehicle, a robotic device, a television, or a computing device.

Aspect 13. A method for processing video data, comprising: obtaining a bitstream; retrieving a granularity type syntax element associated with the bitstream, the granularity type syntax element specifying a type of granularity of one or more pictures over which complexity metrics (CM) associated with the bitstream are applicable; retrieving a period type syntax element associated with the bitstream, the period type syntax element indicating an upcoming period of time or a set of pictures over which the CM are applicable; and decoding a portion of the bitstream based on the granularity type syntax element and the period type syntax element.

Aspect 14. The method of claim 13, wherein a value of the granularity type syntax element specifies that the CM are applicable to a picture or a portion of the picture of the bitstream, the portion of the picture being less than an entirety of the picture.

Aspect 15. The method of claim 13, wherein a value of the granularity type syntax element specifies that the CM are applicable to at least one of a slice, a tile, a subpicture, a scalable layer, or a coding tree unit (CTU) row of the one or more pictures of the bitstream.

Aspect 16. The method of claim 13, wherein the period type syntax element indicates at least one of a specified time interval for the upcoming period, a number of pictures for the upcoming period, that the upcoming period includes all pictures up to a picture including a next slice, or that the upcoming period includes a single picture.

Aspect 17. The method of claim 13, further comprising retrieving a granularity level CM syntax structure associated with the bitstream, the granularity level CM syntax structure specifying granularity level complexity metrics for one or more granularity segments of the bitstream over the upcoming period.

Aspect 18. The method of claim 13, further comprising: retrieving an additional period type syntax element associated with the bitstream, the additional period type syntax element being associated with the granularity type syntax element, wherein the additional period type syntax element differs from the period type syntax element; and decoding a portion of the bitstream based on the granularity type syntax element and the additional period type syntax element.

Aspect 19. The method of claim 13, further comprising retrieving at least one of: a subpicture syntax element associated with the bitstream, the subpicture syntax element indicating that a subpicture identifier (ID) is signaled when the CM applies to multiple pictures; a coding tree block (CTB) number syntax element associated with the bitstream, the CTB number syntax element indicating a total number of coding tree luma blocks over the upcoming period may be signaled in CM when the type of granularity is equal to a slice or a tile and the upcoming period is over multiple pictures; or an average coding tree block (CTB) number syntax element associated with the bitstream, the average CTB number syntax element indicating an average number of CTBs or 4×4 blocks per granularity per picture.

Aspect 20. The method of claim 13, wherein intra-coded block statistics are signaled in association with at least a portion of the bitstream when there are intra-coded blocks available in at least the portion the bitstream.

Aspect 21. The method of claim 13, wherein inter-coded block statistics are signaled in association with at least a portion of the bitstream when there are inter-coded blocks available in at least the portion the bitstream.

Aspect 22. The method of claim 13, further comprising displaying at least the portion of the bitstream on a display.

Aspect 23. The method of claim 13, further comprising determining an operating frequency of a device based on the CM associated with the bitstream.

Aspect 24. An apparatus for processing video data, comprising: at least one memory; and at least one processor coupled to the at least one memory, the at least one processor being configured to: obtain video data; generate, for a bitstream, a granularity type syntax element specifying a type of granularity of one or more pictures over which complexity metrics (CM) associated with the bitstream are applicable; generate, for the bitstream, a period type syntax element associated with the bitstream, the period type syntax element indicating an upcoming period of time or a set of pictures over which the CM are applicable; generate the bitstream associated with the video data, the bitstream including the granularity type syntax element and the period type syntax element; and output the generated bitstream.

Aspect 25. The apparatus of claim 24, wherein a value of the granularity type syntax element specifies that the CM are applicable to a picture or a portion of the picture of the bitstream, the portion of the picture being less than an entirety of the picture.

Aspect 26. The apparatus of claim 24, wherein a value of the granularity type syntax element specifies that the CM are applicable to at least one of a slice, a tile, a subpicture, a scalable layer, or a coding tree unit (CTU) row of the one or more pictures of the bitstream.

Aspect 27. The apparatus of claim 24, wherein the period type syntax element indicates at least one of a specified time interval for the upcoming period, a number of pictures for the upcoming period, that the upcoming period includes all pictures up to a picture including a next slice, or that the upcoming period includes a single picture.

Aspect 28. The apparatus of claim 24, wherein the one or more processors are configured to generate, for the bitstream, a granularity level CM syntax structure specifying specifies granularity level complexity metrics for one or more entities over the upcoming period.

Aspect 29. The apparatus of claim 24, wherein the period type syntax element indicates at least one of a specified time interval for the upcoming period, a number of pictures for the upcoming period, that the upcoming period includes all pictures up to a picture containing a next slice, or that the upcoming period includes a single picture.

Aspect 30. The apparatus of claim 24, wherein the at least one processor is configured to generate, for the bitstream, an additional period type syntax element associated, the additional period type syntax element being associated with the granularity type syntax element, wherein the additional period type syntax element differs from the period type syntax element, and wherein the additional period type syntax element is for decoding a portion of the bitstream with the granularity type syntax element.

Aspect 31. The apparatus of claim 24, wherein the at least one processor is configured to generate, for the bitstream at least one of: a subpicture syntax element associated with the bitstream, the subpicture syntax element indicating that a subpicture identifier (ID) is signaled when the CM applies to multiple pictures; a coding tree block (CTB) number syntax element associated with the bitstream, the CTB number syntax element indicating a total number of coding tree luma blocks over the upcoming period may be signaled in CM when the type of granularity is equal to a slice or a tile and the upcoming period is over multiple pictures; or an average coding tree block (CTB) number syntax element associated with the bitstream, the average CTB number syntax element indicating an average number of CTBs or 4×4 blocks per granularity per picture.

Aspect 32. The apparatus of claim 24, wherein intra-coded block statistics are signaled in association with at least a portion of the bitstream when there are intra-coded blocks available in at least the portion the bitstream.

Aspect 33. The apparatus of claim 24, wherein inter-coded block statistics are signaled in association with at least a portion of the bitstream when there are inter-coded blocks available in at least the portion the bitstream.

Aspect 34. The apparatus of claim 24, further comprising a camera configured to capture the video data.

Aspect 35. The apparatus of claim 24, wherein the apparatus is one of a mobile device, a wearable device, an extended reality device, a camera, a personal computer, a vehicle, a robotic device, a television, or a computing device.

Aspect 36. The apparatus of claim 1, wherein the at least one processor is configured to retrieve one or more quality recovery metrics associated with one or more granularity segments of the bitstream.

Aspect 37. The apparatus of claim 1, wherein the at least one processor is configured to: receive supplemental enhancement information (SEI) message; and retrieve the granularity type syntax element from the SEI message.

Aspect 38. The apparatus of claim 1, wherein the apparatus includes a decoder.

Aspect 39. The apparatus of claim 1, wherein the apparatus includes a camera configured to capture one or more pictures.

Aspect 40. The method of claim 13, wherein the at least one processor is configured to retrieve one or more quality recovery metrics associated with one or more granularity segments of the bitstream.

Aspect 41. The method of claim 13, wherein the at least one processor is configured to: receive supplemental enhancement information (SEI) message; and retrieve the granularity type syntax element from the SEI message.

Aspect 42. The method of claim 13, wherein the apparatus includes a decoder.

Aspect 43. The method of claim 13, wherein the apparatus includes a camera configured to capture one or more pictures.

Aspect 44. The apparatus of claim 24, wherein the at least one processor is configured to encode one or more quality recovery metrics associated with one or more granularity segments of the bitstream.

Aspect 45. The apparatus of claim 24, wherein the at least one processor is configured to: encode a supplemental enhancement information (SEI) message with the granularity type syntax element.

Aspect 46. The apparatus of claim 24, wherein the apparatus includes a decoder.

Aspect 47. The apparatus of claim 24, wherein the apparatus includes a camera configured to capture one or more pictures of the video data.

Aspect 48: A method of processing video data, comprising one or more of operations according to any of Aspects 24 to 47.

Aspect 49: A non-transitory computer-readable medium having stored thereon instructions that, when executed by one or more processors, cause the one or more processors to perform one or more of operations according to any of Aspects 13 to 23 and Aspect 48.

Aspect 50: An apparatus for processing video data, comprising means for performing one or more of operations according to any of Aspects 13 to 23 and Aspect 48.

Aspect 1A: An apparatus for processing video data, comprising: at least one memory; and one or more processors coupled to the at least one memory, the one or more processors being configured to: obtain a bitstream; and retrieve a granularity type syntax element associated with the bitstream, the granularity type syntax element specifying a type of granularity over which complexity metrics (CM) associated with the bitstream are applicable.

Aspect 2A: The apparatus of Aspect 1A, wherein a value of the granularity type syntax element specifies that the CM are applicable to a picture of the bitstream.

Aspect 3A: The apparatus of Aspect 2A, wherein a value of the granularity type syntax element specifies that the CM are applicable to a slice of the bitstream.

Aspect 4A: The apparatus of Aspect 2A, wherein a value of the granularity type syntax element specifies that the CM are applicable to a tile of the bitstream.

Aspect 5A: The apparatus of Aspect 2A, wherein a value of the granularity type syntax element specifies that the CM are applicable to a subpicture of the bitstream.

Aspect 6A: The apparatus of Aspect 2A, wherein a value of the granularity type syntax element specifies that the CM are applicable to a scalable layer of the bitstream.

Aspect 7A: The apparatus of Aspect 2A, wherein a value of the granularity type syntax element specifies that the CM are applicable to a Coding Tree Unit (CTU) row of the bitstream.

Aspect 8A: The apparatus of any of Aspects 1A to 7A, wherein the one or more processors are configured to retrieve a period type syntax element associated with the bitstream, the period type syntax element specifying a type of an upcoming period over which the CM are applicable.

Aspect 9A: The apparatus of any of Aspects 1A to 8A, wherein the one or more processors are configured to retrieve a picture level CM syntax structure associated with the bitstream, the picture level CM syntax structure specifying complexity metrics for one or more pictures over a period.

Aspect 10A: The apparatus of any of Aspects 1A to 9A, wherein the one or more processors are configured to retrieve a granularity level CM syntax structure associated with the bitstream, the granularity level CM syntax structure specifying granularity level complexity metrics for one or more entities over a period.

Aspect 11A: The apparatus of Aspect 10A, wherein the one or more entities include at least one of a slice, a tile, a subpicture, and a layer.

Aspect 12A: The apparatus of any of Aspects 1A to 11A, wherein the one or more processors are configured to retrieve a subpicture syntax element associated with the bitstream, the subpicture syntax element indicating a subpicture identifier (ID) is signaled in the CM when a period is over multiple pictures.

Aspect 13A: The apparatus of any of Aspects 1A to 12A, wherein the one or more processors are configured to retrieve a coding tree block (CTB) number syntax element associated with the bitstream, the CTB number syntax element indicating a total number of coding tree luma blocks over a period may be signaled in CM when the type of granularity is equal to a slice or a tile and a period is over multiple pictures.

Aspect 14A: The apparatus of any of Aspects 1A to 13A, wherein the one or more processors are configured to retrieve an average coding tree block (CTB) number syntax element associated with the bitstream, the average CTB number syntax element indicating an average number of CTBs or 4×4 blocks per granularity per picture.

Aspect 15A: The apparatus of any of Aspects 1A to 14A, wherein intra-coded block statistics are signaled in association with at least a portion of the bitstream when there are intra-coded blocks available in at least the portion the bitstream.

Aspect 16A: The apparatus of any of Aspects 1A to 15A, wherein inter-coded block statistics are signaled in association with at least a portion of the bitstream when there are inter-coded blocks available in at least the portion the bitstream.

Aspect 17A: The apparatus of any of Aspects 1A to 16A, wherein the one or more processors are configured to retrieve one or more quality recovery metrics associated with one or more granularity segments of the bitstream.

Aspect 18A: The apparatus of Aspect 17A, wherein the one or more granularity segments of the bitstream include at least one of a slice, a tile, and a subpicture.

Aspect 19A: The apparatus of any of Aspects 1A to 18A, wherein the one or more processors are configured to: receive supplemental enhancement information (SEI) message; and retrieve the granularity type syntax element from the SEI message.

Aspect 20A: The apparatus of any of Aspects 1A to 19A, wherein the one or more processors are configured to determine an operating frequency of the apparatus based on the CM associated with the bitstream.

Aspect 21A: The apparatus of any of Aspects 1A to 20A, wherein the apparatus includes a decoder.

Aspect 22A: The apparatus of any of Aspects 1A to 21A, further comprising a display configured to display one or more output pictures.

Aspect 23A: The apparatus of any of Aspects 1A to 22A, further comprising a camera configured to capture one or more pictures.

Aspect 24A: The apparatus of any of Aspects 1A to 23A, wherein the apparatus is a mobile device.

Aspect 25A: A method of processing video data, comprising one or more of operations according to any of Aspects 1A to 24A.

Aspect 26A: A non-transitory computer-readable medium having stored thereon instructions that, when executed by one or more processors, cause the one or more processors to perform one or more of operations according to any of Aspects 1A to 24A.

Aspect 27A: An apparatus for processing video data, comprising means for performing one or more of operations according to any of Aspects 1A to 24A.

Aspect 28A: An apparatus for processing video data, comprising: memory; and one or more processors coupled to the memory, the one or more processors being configured to: obtain video data; generate a bitstream associated with the video data; and generate, for the bitstream, a granularity type syntax element specifying a type of granularity over which complexity metrics (CM) associated with the bitstream are applicable.

Aspect 29A: The apparatus of Aspect 28A, wherein a value of the granularity type syntax element specifies that the CM are applicable to a picture of the bitstream.

Aspect 30A: The apparatus of Aspect 29A, wherein a value of the granularity type syntax element specifies that the CM are applicable to a slice of the bitstream.

Aspect 31A: The apparatus of Aspect 29A, wherein a value of the granularity type syntax element specifies that the CM are applicable to a tile of the bitstream.

Aspect 32A: The apparatus of Aspect 29A, wherein a value of the granularity type syntax element specifies that the CM are applicable to a subpicture of the bitstream.

Aspect 33A: The apparatus of Aspect 29A, wherein a value of the granularity type syntax element specifies that the CM are applicable to a scalable layer of the bitstream.

Aspect 34A: The apparatus of Aspect 29A, wherein a value of the granularity type syntax element specifies that the CM are applicable to a Coding Tree Unit (CTU) row of the bitstream.

Aspect 35A: The apparatus of any of Aspects 28A to 34A, wherein the one or more processors are configured to generate, for the bitstream, a period type syntax element specifying a type of an upcoming period over which the CM are applicable.

Aspect 36A: The apparatus of any of Aspects 28A to 35A, wherein the one or more processors are configured to generate, for the bitstream, a picture level CM syntax structure specifying complexity metrics for one or more pictures over a period.

Aspect 37A: The apparatus of any of Aspects 28A to 36A, wherein the one or more processors are configured to generate, for the bitstream, a granularity level CM syntax structure specifying specifies granularity level complexity metrics for one or more entities over a period.

Aspect 38A: The apparatus of Aspect 37A, wherein the one or more entities include at least one of a slice, a tile, a subpicture, and a layer.

Aspect 39A: The apparatus of any of Aspects 28A to 38A, wherein the one or more processors are configured to generate, for the bitstream, a subpicture syntax element indicating a subpicture identifier (ID) is signaled in the CM when a period is over multiple pictures.

Aspect 40A: The apparatus of any of Aspects 28A to 39A, wherein the one or more processors are configured to generate, for the bitstream, a coding tree block (CTB) number syntax element indicating a total number of coding tree luma blocks over a period may be signaled in CM when the type of granularity is equal to a slice or a tile and a period is over multiple pictures.

Aspect 41A: The apparatus of any of Aspects 28A to 40A, wherein the one or more processors are configured to generate, for the bitstream, an average coding tree block (CTB) number syntax element indicating an average number of CTBs or 4×4 blocks per granularity per picture.

Aspect 42A: The apparatus of any of Aspects 28A to 41A, wherein intra-coded block statistics are signaled in association with at least a portion of the bitstream when there are intra-coded blocks available in at least the portion the bitstream.

Aspect 43A: The apparatus of any of Aspects 28A to 42A, wherein inter-coded block statistics are signaled in association with at least a portion of the bitstream when there are inter-coded blocks available in at least the portion the bitstream.

Aspect 44A: The apparatus of any of Aspects 28A to 43A, wherein the one or more processors are configured to generate, for the bitstream, one or more quality recovery metrics associated with one or more granularity segments of the bitstream.

Aspect 45A: The apparatus of Aspect 44A, wherein the one or more granularity segments of the bitstream include at least one of a slice, a tile, and a subpicture.

Aspect 46A: The apparatus of any of Aspects 28A to 45A, wherein the one or more processors are configured to: generate supplemental enhancement information (SEI) message; and include the granularity type syntax element in the SEI message.

Aspect 47A: The apparatus of any of Aspects 28A to 46A, wherein the one or more processors are configured to store the bitstream.

Aspect 48A: The apparatus of any of Aspects 28A to 47A, wherein the one or more processors are configured to transmit the bitstream.

Aspect 49A: The apparatus of any of Aspects 28A to 48A, wherein the apparatus includes an encoder.

Aspect 50A: The apparatus of any of Aspects 28A to 49A, further comprising a display configured to display one or more output pictures.

Aspect 51A: The apparatus of any of Aspects 28A to 50A, further comprising a camera configured to capture one or more pictures.

Aspect 52A: The apparatus of any of Aspects 28A to 51A, wherein the apparatus is a mobile device.

Aspect 53A: A method of processing video data, comprising one or more of operations according to any of Aspects 28A to 52A.

Aspect 54A: A non-transitory computer-readable medium having stored thereon instructions that, when executed by one or more processors, cause the one or more processors to perform one or more of operations according to any of Aspects 28A to 52A.

Aspect 55A: An apparatus for processing video data, comprising means for performing one or more of operations according to any of Aspects 28A to 52A.

What is claimed is:
1. An apparatus for processing video data, comprising:
at least one memory; and
at least one processor coupled to the at least one memory, the at least one processor being configured to:
obtain a bitstream;
retrieve a granularity type syntax element associated with the bitstream, the granularity type syntax element specifying a type of granularity of one or more pictures over which complexity metrics (CM) associated with the bitstream are applicable;
retrieve a period type syntax element associated with the bitstream, the period type syntax element indi- cating an upcoming period of time or a set of pictures over which the CM are applicable; and decode a portion of the bitstream based on the granularity type syntax element and the period type syntax element.

2. The apparatus of claim 1, wherein a value of the granularity type syntax element specifies that the CM are applicable to a picture or a portion of the picture of the bitstream, the portion of the picture being less than an entirety of the picture.

3. The apparatus of claim 1, wherein a value of the granularity type syntax element specifies that the CM are applicable to at least one of a slice, a tile, a subpicture, a scalable layer, or a coding tree unit (CTU) row of the one or more pictures of the bitstream.

4. The apparatus of claim 1, wherein the period type syntax element indicates at least one of a specified time interval for the upcoming period, a number of pictures for the upcoming period, that the upcoming period includes all pictures up to a picture including a next slice, or that the upcoming period includes a single picture.

5. The apparatus of claim 1, wherein the at least one processor is configured to retrieve a granularity level CM syntax structure associated with the bitstream, the granularity level CM syntax structure specifying granularity level complexity metrics for one or more granularity segments of the bitstream over the upcoming period.

6. The apparatus of claim 1, wherein the at least one processor is configured to:

retrieve an additional period type syntax element associated with the bitstream, the additional period type syntax element being associated with the granularity type syntax element, wherein the additional period type syntax element differs from the period type syntax element; and decode the portion of the bitstream based on the granularity type syntax element and the additional period type syntax element.

7. The apparatus of claim 1, wherein the at least one processor is configured to retrieve at least one of:

a subpicture syntax element associated with the bitstream, the subpicture syntax element indicating that a subpicture identifier (ID) is signaled when the CM applies to multiple pictures;

a coding tree block (CTB) number syntax element associated with the bitstream, the CTB number syntax element indicating a total number of coding tree luma blocks over the upcoming period may be signaled in CM when the type of granularity is equal to a slice or a tile and the upcoming period is over multiple pictures; or an average CTB number syntax element associated with the bitstream, the average CTB number syntax element indicating an average number of CTBs or 4×4 blocks per granularity per picture.

8. The apparatus of claim 1, wherein intra-coded block statistics are signaled in association with at least a portion of the bitstream when there are intra-coded blocks available in at least the portion the bitstream.

9. The apparatus of claim 1, wherein inter-coded block statistics are signaled in association with at least a portion of the bitstream when there are inter-coded blocks available in at least the portion the bitstream.

10. The apparatus of claim 1, wherein the at least one processor is configured to determine an operating frequency of the apparatus based on the CM associated with the bitstream.

11. The apparatus of claim 1, further comprising a display configured to display at least the portion of the bitstream.

12. The apparatus of claim 1, wherein the apparatus is one of a mobile device, a wearable device, an extended reality device, a camera, a personal computer, a vehicle, a robotic device, a television, or a computing device.

13. A method for processing video data, comprising:

obtaining a bitstream;

retrieving a granularity type syntax element associated with the bitstream, the granularity type syntax element specifying a type of granularity of one or more pictures over which complexity metrics (CM) associated with the bitstream are applicable;

retrieving a period type syntax element associated with the bitstream, the period type syntax element indicating an upcoming period of time or a set of pictures over which the CM are applicable; and decoding a portion of the bitstream based on the granularity type syntax element and the period type syntax element.

14. The method of claim 13, wherein a value of the granularity type syntax element specifies that the CM are applicable to a picture or a portion of the picture of the bitstream, the portion of the picture being less than an entirety of the picture.

15. The method of claim 13, wherein a value of the granularity type syntax element specifies that the CM are applicable to at least one of a slice, a tile, a subpicture, a scalable layer, or a coding tree unit (CTU) row of the one or more pictures of the bitstream.

16. The method of claim 13, wherein the period type syntax element indicates at least one of a specified time interval for the upcoming period, a number of pictures for the upcoming period, that the upcoming period includes all pictures up to a picture including a next slice, or that the upcoming period includes a single picture.

17. The method of claim 13, further comprising retrieving a granularity level CM syntax structure associated with the bitstream, the granularity level CM syntax structure specifying granularity level complexity metrics for one or more granularity segments of the bitstream over the upcoming period.

18. The method of claim 13, further comprising:

retrieving an additional period type syntax element associated with the bitstream, the additional period type syntax element being associated with the granularity type syntax element, wherein the additional period type syntax element differs from the period type syntax element; and decoding a portion of the bitstream based on the granularity type syntax element and the additional period type syntax element.

19. The method of claim 13, further comprising retrieving at least one of:

a subpicture syntax element associated with the bitstream, the subpicture syntax element indicating that a subpicture identifier (ID) is signaled when the CM applies to multiple pictures;

a coding tree block (CTB) number syntax element associated with the bitstream, the CTB number syntax element indicating a total number of coding tree luma blocks over the upcoming period may be signaled in CM when the type of granularity is equal to a slice or a tile and the upcoming period is over multiple pictures; or an average CTB number syntax element associated with the bitstream, the average CTB number syntax element indicating an average number of CTBs or 4×4 blocks per granularity per picture.

20. The method of claim 13, wherein intra-coded block statistics are signaled in association with at least a portion of the bitstream when there are intra-coded blocks available in at least the portion the bitstream.

21. The method of claim 13, wherein inter-coded block statistics are signaled in association with at least a portion of the bitstream when there are inter-coded blocks available in at least the portion the bitstream.

22. The method of claim 13, further comprising displaying at least the portion of the bitstream on a display.

23. The method of claim 13, further comprising determining an operating frequency of a device based on the CM associated with the bitstream.

24. An apparatus for processing video data, comprising:
at least one memory; and
at least one processor coupled to the at least one memory, the at least one processor being configured to:
obtain video data;
generate, for a bitstream, a granularity type syntax element specifying a type of granularity of one or more pictures over which complexity metrics (CM) associated with the bitstream are applicable;
generate, for the bitstream, a period type syntax element associated with the bitstream, the period type syntax element indicating an upcoming period of time or a set of pictures over which the CM are applicable;
generate the bitstream associated with the video data, the bitstream including the granularity type syntax element and the period type syntax element; and
output the generated bitstream.

25. The apparatus of claim 24, wherein a value of the granularity type syntax element specifies that the CM are applicable to a picture or a portion of the picture of the bitstream, the portion of the picture being less than an entirety of the picture.

26. The apparatus of claim 24, wherein a value of the granularity type syntax element specifies that the CM are applicable to at least one of a slice, a tile, a subpicture, a scalable layer, or a coding tree unit (CTU) row of the one or more pictures of the bitstream.

27. The apparatus of claim 24, wherein the period type syntax element indicates at least one of a specified time interval for the upcoming period, a number of pictures for the upcoming period, that the upcoming period includes all pictures up to a picture including a next slice, or that the upcoming period includes a single picture.

28. The apparatus of claim 24, wherein the at least one processor is configured to generate, for the bitstream, a granularity level CM syntax structure specifying specifies granularity level complexity metrics for one or more entities over the upcoming period.

29. The apparatus of claim 24, wherein the period type syntax element indicates at least one of a specified time interval for the upcoming period, a number of pictures for the upcoming period, that the upcoming period includes all pictures up to a picture containing a next slice, or that the upcoming period includes a single picture.

30. The apparatus of claim 24, wherein the at least one processor is configured to generate, for the bitstream, an additional period type syntax element associated, the additional period type syntax element being associated with the granularity type syntax element, wherein the additional period type syntax element differs from the period type syntax element, and wherein the additional period type syntax element is for decoding a portion of the bitstream with the granularity type syntax element.

31. The apparatus of claim 24, wherein the at least one processor is configured to generate, for the bitstream at least one of:
a subpicture syntax element associated with the bitstream, the subpicture syntax element indicating that a subpicture identifier (ID) is signaled when the CM applies to multiple pictures;
a coding tree block (CTB) number syntax element associated with the bitstream, the CTB number syntax element indicating a total number of coding tree luma blocks over the upcoming period may be signaled in CM when the type of granularity is equal to a slice or a tile and the upcoming period is over multiple pictures; or
an average CTB number syntax element associated with the bitstream, the average CTB number syntax element indicating an average number of CTBs or 4×4 blocks per granularity per picture.

32. The apparatus of claim 24, wherein intra-coded block statistics are signaled in association with at least a portion of the bitstream when there are intra-coded blocks available in at least the portion the bitstream.

33. The apparatus of claim 24, wherein inter-coded block statistics are signaled in association with at least a portion of the bitstream when there are inter-coded blocks available in at least the portion the bitstream.

34. The apparatus of claim 24, further comprising a camera configured to capture the video data.

35. The apparatus of claim 24, wherein the apparatus is one of a mobile device, a wearable device, an extended reality device, a camera, a personal computer, a vehicle, a robotic device, a television, or a computing device.

* * * * *